Feb. 17, 1970  D. E. ROGERS  3,495,907

INDICATING MEANS

Filed Feb. 1, 1966

INVENTOR.
Donald E. Rogers
BY
Barnard, McGlynn & Reising
ATTORNEYS

United States Patent Office 3,495,907
Patented Feb. 17, 1970

3,495,907
INDICATING MEANS
Donald E. Rogers, 32762 White Oaks Trail,
Birmingham, Mich. 48010
Filed Feb. 1, 1966, Ser. No. 524,263
Int. Cl. G01b *11/18;* G01n *21/40*
U.S. Cl. 356—34
4 Claims

ABSTRACT OF THE DISCLOSURE

An indicating washer for indicating clamping pressure in a fastener assembly including an annular body of plastic material having a pair of parallel surfaces with a layer of light polarizing material on one surface and a layer of light reflective material on the other surface.

---

This invention relates to indicating means, and more particularly to means adapted to be used in connection with a fastening assembly for indicating the clamping pressure in the fastening assembly.

In many articles of manufacture, fastening assemblies are utilized to secure two or more parts together. It is often desirable that the fastening assembly be secured so as to provide a predetermined clamping force, or clamping pressure, on the parts joined. Typical of such fastening assemblies is a nut and bolt installation, where a bolt passes through apertures in the parts to be secured together and a nut is threadedly received on the end of the bolt to clamp the parts between the head of the bolt and the nut.

In the past, several methods have been utilized to determine whether or not the clamping pressure is sufficient when the fastener installation is assembled. For example, with a nut and bolt assembly, a torque wrench may be used to tighten the nut to a predetermined torque, as measured by the gauge on the torque wrench. Alternatively, some means may be employed to measure the tension in the shank of the bolt through the use of strain gauges, or measuring bolt elongation by micrometers, or other external means, as an indication of bolt tension. Still another method utilizes deformation or destruction of one of the members of the fastening assembly to indicate when the proper forces are applied to the pieces being joined together.

Such methods are often unsatisfactory. In addition to the fact that external means are required, or that expensive equipment is necessary, to measure the proper assembly pressures, false readings are easily obtained which indicate that the fastening assembly is properly tightened and yet this may not be the case. With a torque wrench, for example, it is entirely possible for the nut in a nut and bolt assembly to hang up on the bolt threads to such an extent that the torque wrench will indicate a proper torque on the assembly when, in fact, the proper clamping pressure has not been applied.

A device in which this invention is embodied comprises, generally, a plastic body member having a reflective coating on one surface thereof and an overlying layer of light polarizing material on a surface opposite from the reflecting layer, such structure being adapted to be included within the fastener assembly in such a manner that the clamping pressure is born directly by the structure. The light polarizing layer and the reflecting surface create a visual series of bands in the surface of the structure, such bands being movable as the structure is stressed in a manner similar to the theory of photo-elastic stress analysis. For example, when the structure is used in a nut and bolt assembly, the structure may be in the form of a washer placed between the head of the bolt and the workpiece, or between a separate washer in the assembly and the workpiece. As the fastening assembly is tightened, the clamping pressure on the structure causes the stresses within the structure to build up, in turn causing movement in the bands in the surface of the structure. The movement of the bands can be calibrated to indicate a desirable amount of clamping pressure, and the release of clamping pressure or loosening of the fastener assembly can be noted at a later time by observing different positioning of the bands within the structure.

Such a device gives a true indication of the clamping pressure within the fastening assembly, clamping pressure being the most desirable and accurate parameter in measuring the tightness of the fastening assembly. No external instruments, such as micrometers, strain gauges or the like, are necessary and the device is reusable and not destroyed in tightening the assembly. The device is simple to manufacture and produce, and is easily installed in a fastener assembly for indicating the clamping pressure therein.

These and other advantages will become more apparent from the following description and drawing in which.

Figure 1:
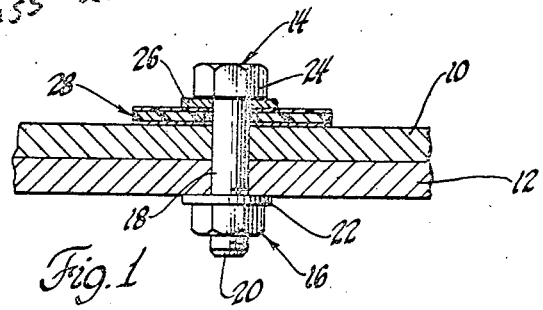
FIGURE 1 is a cross-sectional view of a typical fastening assembly, illustrating the indicating means in the form of a washer disposed between the bolt head and the parts joined together.

Referring more particularly to the drawing, FIGURE 1 best illustrates a typical fastener installation in which workpieces 10 and 12 are secured together by means of a bolt, indicated generally by the numeral 14, and a nut, indicated generally by the numeral 16. Bolt shank 18 passes through suitable apertures in the workpieces 10 and 12, and is threaded as at 20 to receive an internal thread in the nut 16. Disposed between nut 16 and the workpiece 12 is a washer 22, and disposed between the head 24 of the bolt 14 and the workpiece 10 is a washer 26. It is the clamping pressure between the nut 16 and the bolt head 24, transmitted to the workpieces 10 and 12, which indicates the proper installation of the fastener assembly.

Figure 2:
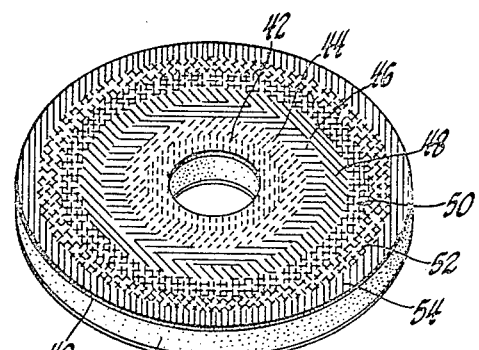
FIGURE 2 is an isometric view of the indicator means illustrated in FIGURE 1.
Figure 3:
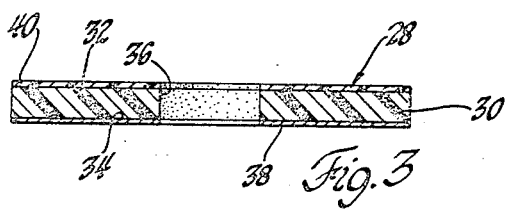
FIGURE 3 is an enlarged cross-sectional view of the indicating means illustrated in FIGURES 1 and 2.

Disposed between the washer 26 and the workpiece 10 is an indicator means, illustrated generally by the numeral 28, such means being so disposed between the bolt head 24 and the nut 16 as to directly receive the clamping pressure in the assembly. With reference to FIGURES 2 and 3, where the indicating means 28 is more clearly illustrated, the indicating means is shown to include an annular plastic body portion 30 having generally parallel surfaces 32 and 34. A central aperture 36 receives the bolt shank 18, and a reflective surface 38 is disposed on the bottom surface of the plastic body 30. Such reflective surface may be in the form of paint, or the like, so as to reflect light rays passing through the plastic body portion 30 from the upper surface thereof. Body portion 30 is of such material that becomes doubly refracting when subjected to mechanical stress.

At the upper surface of the plastic body portion 30 is a light polarizing layer 40 which is of substantially the same shape as the body portion 30. Light polarizing layer 40 serves to filter and orient light rays passing through the layer 40 and the body portion 30 to the reflective surface 38. Upon reflection back to the polarizing layer 40, such light rays will appear in the form of a plurality of bands as indicated in FIGURE 2. Depending upon the light source, such bands may be the colors of the spectrum, such as red band 42, orange band 44, yellow band 46, green band 48, blue band 50, indigo band 52 and violet band 54. Should a different kind of light be used, the bands may appear in alternating black and white or varying shades of grey.

In operation, the washer structure 28 is placed between the washer 26 and the workpiece 10 in the fastener assembly and the nut 16 is tightened until a predetermined color band appears adjacent some point, such as the edge of the washer 26, in the assembly. When such predetermined band appears, it is then known that the desired clamping force has been applied to the workpieces 10 and 12. At some later time, should it be desirable to examine fastening assembly to see whether or not the clamping pressure has relaxed, a glance will tell whether the proper color or proper band is adjacent the desired location, thus indicating any change in clamping pressure.

Figure 4:
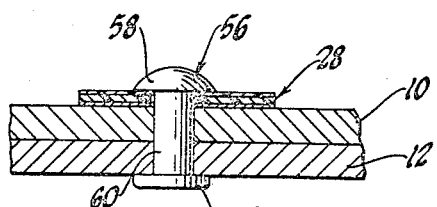
FIGURE 4 is a cross-sectional view of another type of fastener installation, illustrating the use of an indicator means therein.

Referring to FIGURE 4, the indicating means 28 is shown in a rivet fastening assembly wherein a rivet, illustrated generally by the numeral 56, is provided with an enlarged head 58 and a shank 60. The end of shank 60 is peened over, as at 62, to secure the workpieces 10 and 12 together. Indicating means 28 serves the same function as hereinbefore described, indicating the degree of clamping pressure when rivet 56 is set.

Figure 5:
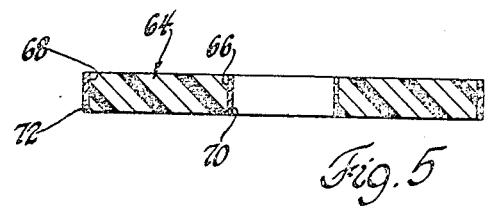
FIGURE 5 is an enlarged cross-sectional view similar to FIGURE 3, of a modified form of the indicating means, with the reflecting surface and polarizing layer on different faces of the structure.

A modification of the above-described indicator means is illustrated in FIGURE 5. The structure there shown includes a body portion, indicated generally by the numeral 64, of generally annular form, having parallel edge surfaces 66 and 68 respectively. A reflective coating 70 is applied to inner surface 66 and a band of light polarizing material 72 is applied to the outer annular surface 68. In this manner, light transmitted in a horizontal plane, is viewed in FIGURE 5, passing through the polarizing layer 72, the body portion 64 and reflected from the reflective surface 66, will appear as bands on the surface of the polarizing layer 72. Changes in clamping pressure on the body portion 64 will be indicated by movement of the bands along the surface of the polarizing layer 72, thus indicating the application of clamping pressure or changes in clamping pressure.

It will be readily understood that indicating means as hereinbefore described are not restricted to use in nut and bolt rivet assemblies, but are usable in any fastening assembly where clamping pressure is a parameter desired to be indicated, and which permits a visual location of the indicator means. It will also be apparent that the annular shape of the indicator means is not critical, but may be best suited to the fastener installation in which the device is used.

Thus, clamping pressure indicating means are provided which give a true indication of the clamping pressure within a fastener installation. The device does not require external equipment, such as strain gauges, micrometers or the like, to show the indication of the desired parameter. The device is positive in operation and is reusable, since it is not deformed or destroyed in its operation.

Changes and modifications to the structure will occur to those having skill in the art after having had reference to the foregoing description and drawing. However, it is not intended to limit the scope of the invention by the foregoing description and drawing, but by the scope of the appended claims in which:

The embodiments of the invention in which an exclusive property or privilege is claimed are defined as follows:

1. A method of applying a desired clamping pressure between a fastener and a workpiece comprising the steps of: inserting a washer having a doubly refracting plastic body with reflecting means on one surface and light polarizing means on an opposite parallel surface between opposed surfaces of the fastener and workpiece such that the washer member is subjected to clamping pressure existing between the opposed surfaces with the washer oriented such that the light polarizing surface is visible; directing light rays through an exposed surface of the washer to the surface having reflecting means thereon to produce a plurality of light bands on the surface having the light polarizing means thereon; and tightening the fastener to increase the clamping pressure and cause said light bands to move in accordance with the increased pressure on the washer, and continuing to tighten the fastener until the bands reach a location corresponding to the desired clamping pressure.

2. A fastening and clamping pressure indicating assembly comprising: a workpiece having an opening therein; a fastener having a head and a shank with the shank mounted in said opening with means exerting clamping pressure between the head of the fastener and the workpiece, a clamping pressure indicating washer received between the fastener head and the workpiece, said washer having an annular body of light transmitting, double refracting plastic material having a pair of inner and outer surfaces; a layer of light polarizing material on said outer surface, and a layer of light reflective material on said inner surface, the polarizing material causing light passing therethrough and through said body and reflected by said reflecting material to appear as visually distinguishable bands on said polarizing layer, said bands being movable in response to changes in clamping pressure between the fastener and workpiece whereby the position of the bands provides a visual indication of clamping pressure.

3. A fastening and clamping pressure indicating assembly as claimed in claim 2 wherein said inner surface is defined by the inner annular edge of said washer adjacent the shank of said fastener and said outer surface is defined by the outer annular edge of said washer.

4. A fastening and clamping pressure indicating assembly as claimed in claim 2 wherein said inner surface is defined by the planar surface of said washer adjacent the workpiece and said outer surface is defined by the planar surface of said washer adjacent the head of the fastener.

References Cited

UNITED STATES PATENTS

| | | |
|---|---|---|
| 3,077,813 | 2/1963 | Zandman. |
| 3,122,918 | 3/1964 | Emery et al. |
| 3,313,204 | 4/1967 | Oppel. |
| 3,313,205 | 4/1967 | Roberts et al. |

RONALD L. WIBERT, Primary Examiner

J. ROTHENBERG, Assistant Examiner

U.S. Cl. X.R.

73—88; 85—50, 62; 356—114